United States Patent [19]

Roberts

[11] 4,361,214

[45] Nov. 30, 1982

[54] DRUM BRAKE HAVING A VIBRATION DAMPING MEMBER

[75] Inventor: James K. Roberts, South Bend, Ind.

[73] Assignee: The Bendix Corporation, Southfield, Mich.

[21] Appl. No.: 225,212

[22] Filed: Jan. 15, 1981

[51] Int. Cl.³ .................................. F16D 65/08
[52] U.S. Cl. .............................. 188/335; 188/381
[58] Field of Search ............... 188/78, 335, 340, 217, 188/381, 382

[56] References Cited

FOREIGN PATENT DOCUMENTS 121020 2/1946 Australia ............................ 188/335
669413 4/1952 United Kingdom ............... 188/335

Primary Examiner—Duane A. Reger

Attorney, Agent, or Firm—Paul David Schoenle; Ken C. Decker

[57] ABSTRACT

A drum brake assembly (10) includes a torque member (12) which supports a hydraulic actuator (26). The hydraulic actuator is engageable with a pair of brake shoes (20, 22) and is operable to move the pair of brake shoes into a braking position. The torque member comprises a central portion (40) which attaches to an axle assembly (84) and a plurality of arms (42, 44, 46) extending radially outward from the central portion. In the preferred embodiment the plurality of arms cooperate with the central portion to substantially form a Y-shaped member. One of the arms (42) substantially forms the hydraulic actuator to integrally form the latter with the one arm. The other arms are provided with slots (64, 66) to direct the movement of the pair of brake shoes and resilient elastomeric members within the slots opposes axial movement of the pair of brake shoes.

8 Claims, 8 Drawing Figures

DRUM BRAKE HAVING A VIBRATION DAMPING MEMBER

The invention relates to a drum brake. More particularly, the invention relates to a drum brake of the type having a pair of arcuate brake shoes which are carried by a torque member. The brake shoes are radially movable into engagement with a rotatable brake drum to retard rotation of the brake drum during a brake application. The torque member includes a multiplicity of radially-extending arms which define radially-extending slots therein. The brake shoes include radially-extending web portions which are slidably received in the slots of the torque member arms. Consequently, the brake shoes are guided for radial movement relative to the torque member by the slots in the arms of the torque member. Drum brakes of this type are commonly referred to as being of the web-guided type.

In order to control the sliding movement of the brake shoes relative to the torque member, resilient members are received in the slots of the torque member. The resilient members cooperate with the torque member and with the web portions of the brake shoes to allow a limited axial movement of the brake shoes relative to the torque member. A uniform engagement of the brake shoes with the brake drum is provided by the limited axial movement of the brake shoes. Additionally, the resilient members damp vibration of the brake shoes during a brake application.

A drum brake is known in accordance with the U.S. Pat. No. 4,182,439, granted Jan. 8, 1980, to Kluger et al, the disclosure of which is expressly incorporated herein by reference. In the drum brake of the Kluger et al, invention, the torque member is an inverted Y-shape. One radially-extending arm of the torque member carries an anchor pin to which a pair of brake shoes pivotally anchor. Additionally, the one arm of the torque member defines a cylindrical bore therethrough which sealingly receives a pair of pistons to define a hydraulic actuator for the pair of brake shoes. The other two radially-extending arms of the torque member define radially-extending slots which receive the radially-extending web portions of the brake shoes. A U-shaped resilient spring clip is carried in each of the slots of the other two torque member arms. The resilient spring clips frictionally engage the torque member and the brake shoe webs to prevent the brake shoes from vibrating, or chattering during a brake application. Additionally, the resilience of the spring clips provides for a limited axial movement of the brake shoes relative to the torque member so that the brake shoes make uniform contact with the brake drum during a brake application.

With a drum brake of the kind illustrated in the Kluger et al, patent, the spring clips and the brake shoe webs are formed of steel, which is subject to rusting and corrosion. The spring clips slidingly engage the brake shoe webs. Consequently, rusting and roughening of the surfaces where the spring clips and the brake shoe webs slidably engage each other interferes with smooth sliding movement of the brake shoes relative to the torque member during a brake application. Roughness in the movement of the brake shoes during a brake application is undesirable because the vehicle operator may feel the roughness through the brake pedal. Further, if the brake is inactive during an extended period of time, it is possible for the spring clips to rust immovably fast to the brake shoe webs so that the brake shoes cannot move freely relative to the torque member. For example, if the vehicle upon which the brake is mounted is stored for an extended period of time in a relatively humid environment, the spring clips may rust and adhere to the brake shoe webs so that the brake does not operate properly when the vehicle is again returned to service.

A further consideration with the brake shown in the Kluger et al, patent is that the torque member may be made of aluminum or magnesium. The spring clips are formed of steel and are in contact with the torque member. Consequently, the Kluger et al, brake places two dissimilar metals having differing electrochemical potentials in contact with each other. The galvanic couple thus formed exacerbates the corrosion and rusting problem which is inherent in the spring steel clips, particularly when the brake is exposed to an electrolytic, such as salt water.

In addition, the spring steel clips used in the Kluger et al, brake are a relatively expensive component part of the brake. The spring steel clips add a significant expense to the manufacturing cost of a complete brake.

The invention as claimed is intended to avoid the drawbacks of prior drum brakes of the web-guided type by providing a drum brake wherein the resilient members are formed of a corrosion-resistant, electrically nonconductive elastomeric material. The resilient members are received in apertures defined by the brake shoe webs. In order to space the brake shoe webs from the torque member, the resilient members extend axially on both sides of the brake shoe webs and are slidably received in the slots of the torque member. By interposing a nonconductive material between the dissimilar metals of the torque member and brake shoes, the resilient members prevent the formation of a galvanic couple at the interface between the torque member and the brake shoe webs. Because the elastomeric resilient members frictionally engage the torque member arms, the resilient members damp vibration of the brake shoes during a brake application. Further, distortion of the elastomeric resilient members provides for limited axial movement of the brake shoes relative to the torque member so that the brake shoes uniformly engage the brake drum during a brake application.

The advantages offered by the invention are mainly that the elastomeric resilient members are less expensive to manufacture and install than are the U-shaped spring steel clips of prior web-guided drum brakes; the elastomeric resilient members are not subject to corrosion; the nonconductive resilient members prevent the formation of a galvanic couple between the brake shoes and torque member; and the elastomeric resilient members provide for smooth sliding movement of the brake shoes relative to the torque member because they prevent metal-to-metal sliding contact and yieldably compensate for roughness of the surface upon which they slide.

One way of carrying out the invention is described in detail below with reference to drawings which illustrate only one specific embodiment, in which.

Figure 1:
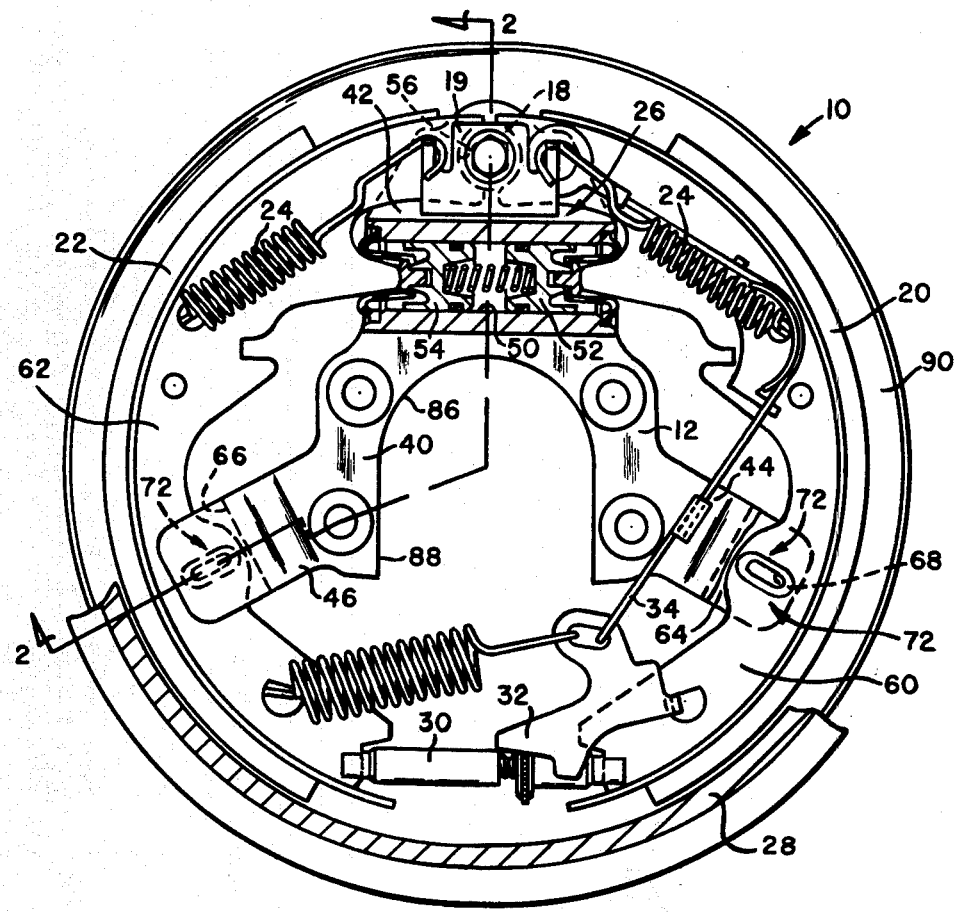
FIG. 1 is a view of a drum brake assembly made according to the present invention.
Figure 2:
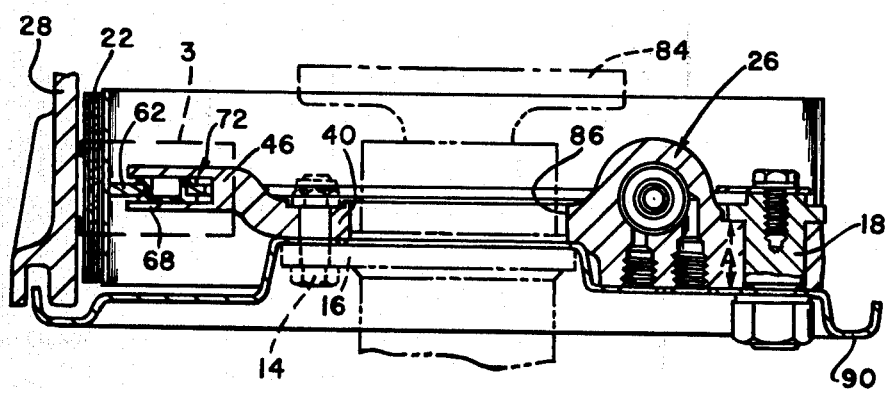
FIG. 2 is a cross-sectional view of FIG. 1 taken along the line 2—2 in FIG. 1.
Figure 3:
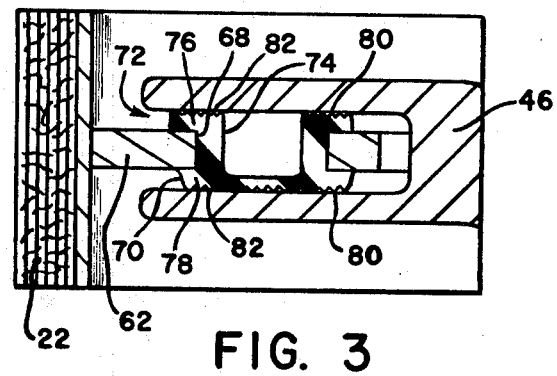
FIG. 3 is an enlarged fragmentary view of an encircled portion of FIG. 2.

In the drum brake assembly 10 illustrated in FIGS. 1–3, a torque member 12 is attached by any suitable means, such as bolts 14, to an axle assembly flange 16. The torque member 12 is provided with an anchor pin 18 for transferring brake torque from a pair of brake shoes 20 and 22 to the torque member. The anchor pin 18 also supports the shoe guide plate 19 which limits axial movement of the brake shoes. Retraction springs 24 resiliently urge the pair of brake shoes into engagement with the anchor pin 18.

A hydraulic actuator 26 engages the pair of brake shoes to move the latter to a braking position frictionally engaging the drum 28. An extendible member 30 cooperates with a pawl 32 and a cable 34 to provide for automatic adjustment of the pair of brake shoes relative to the drum 28 in a well-known manner.

In accordance with the invention, the torque member 12 is constructed of aluminum or magnesium to form a central portion 40 and a plurality of arms at 42, 44 and 46 which extend radially from the central portion 40. The first arm 42 is constructed with a bore 50 extending transversely to the radial extension of the first arm. The bore 50 receives a pair of pistons 52 and 54 to define the hydraulic actuator so that the hydraulic actuator is substantially integral with the first arm 42 of the torque member. The first arm is also provided with an opening 56 to receive the anchor pin 18. As the braking torque developed by the pair of brake shoes is transmitted to the anchor pin 18 and through the first arm 42 to the bolts 14, the first arm includes an axial thickness at A which is larger than the axial thickness of the arms 44 and 46.

The right brake shoe 20 and the left brake shoe 22 include radially-extending webs 60 and 62 which are received in respective slots 64 and 66 on the second arm 44 and the third arm 46. Moreover, the brake shoe webs 60 and 62 define apertures 68. Resilient members 72 are received in the apertures 68. The resilient members 72 are made of a yieldable, resilient elastomeric material. Upon inspection of the Figures it will be apparent that the resilient members 72 are slidably received in the slots 64 and 66.

FIG. 3 illustrates that the resilient members 72 include a pair of spaced-apart flanges 76 and 78 which extend axially on each side of the brake shoe webs 60 and 62. The flanges 76 and 78 extend radially adjacent the brake shoe web to circumscribe the apertures 68. A recess 74 is defined by the resilient member 72. The recess 74 extends axially through the aperture 68. Further, the flange 78, which is disposed away from the opening of the recess 74, is tapered at 70 so that the resilient member 72 may be distorted for its installation into the aperture 68.

The resilient member 72 defines an irregular surface 80 which slidably engages the opposed walls of the slot 66. The irregular surface 80 is defined by a multiplicity of spaced-apart resilient ribs 82 which extend axially from the resilient member 72. Because the contact of the resilient members 72 with the torque member 12 is defined by the contact of the multiplicity of ribs 82 with the walls of the slots 64 and 66, the resilient members 72 provide for smooth radial movement of the brake shoes 20 and 22 during a brake application. The ribs 82 provide a squeegee effect upon movement of the brake shoes relative to thee torque member so that dirt and contamination are wiped from the area where the resilient members 72 slidably contact the torque member. Further, the ribs 82 are able to slide individually over any contamination which is not wiped from the path of the resilient member 72. Similarly, the ribs 82 are able to slide individually over asperities which may develop due to roughening in the slots 64 and 66 during the service life of the brake. Roughness may develop in the slots 64 and 66 due to exposure of the brake to adverse environments. Consequently, the slots and resilient members cooperate with the brake shoe webs 60 and 62 to space the brake shoes form the torque member. Further, the resilient members yieldably oppose any axial movement of the brake shoes 20 and 22, thereby directing the radial expansion of the brake shoes into engagement with the brake drum 28. Distortion of the resilient members 72 allows a limited axial and angular movement for the brake shoes upon a brake application so that the brake shoes uniformly engage the brake drum. The resilient ribs 82 slidably and frictionally engage the walls of the slots 64 and 66 to damp vibration of the brake shoes during a brake application.

Turning to FIG. 2, an axle shaft is shown in phantom at 84. Generally, this shaft is larger in diameter at its end than the opening 86 in the central portion 40 so that the axle shaft must be removed before the torque member can be attached to the axle assembly. However, the torque member provides a recess at 88 on the central portion 40 circumferentially between the second arm 44 and the third arm 46, thereby permitting radial attachment of the torque member to the axle assembly when the shaft 84 is installed in the axle assembly. If the axle shaft is separated from the axle assembly, it is possible to axially or radially attach the torque member to the flange 16.

In order to protect the brake shoes and hydraulic actuator from dust and other contaminants, a dust shield 90 is secured between the flange 16 and the central portion 40. When the torque member is being radially installed or removed, it is necessary to disconnect the dust shield from the torque member.

The drum brake assembly 10 operates in a conventional manner such that pressurized fluid communicated to the hydraulic actuator moves the pistons 52 and 54 outward thereby urging the pair of brake shoes into frictional engagement with the rotating drum to effectuate braking. During radial extension of the pair of brake shoes and when the latter contact the drum, the resilient members 72 and slots 64 and 66 limit axial movement of the brake shoes to provide for uniform engagement between the brake shoes and the drum.

Figure 4:
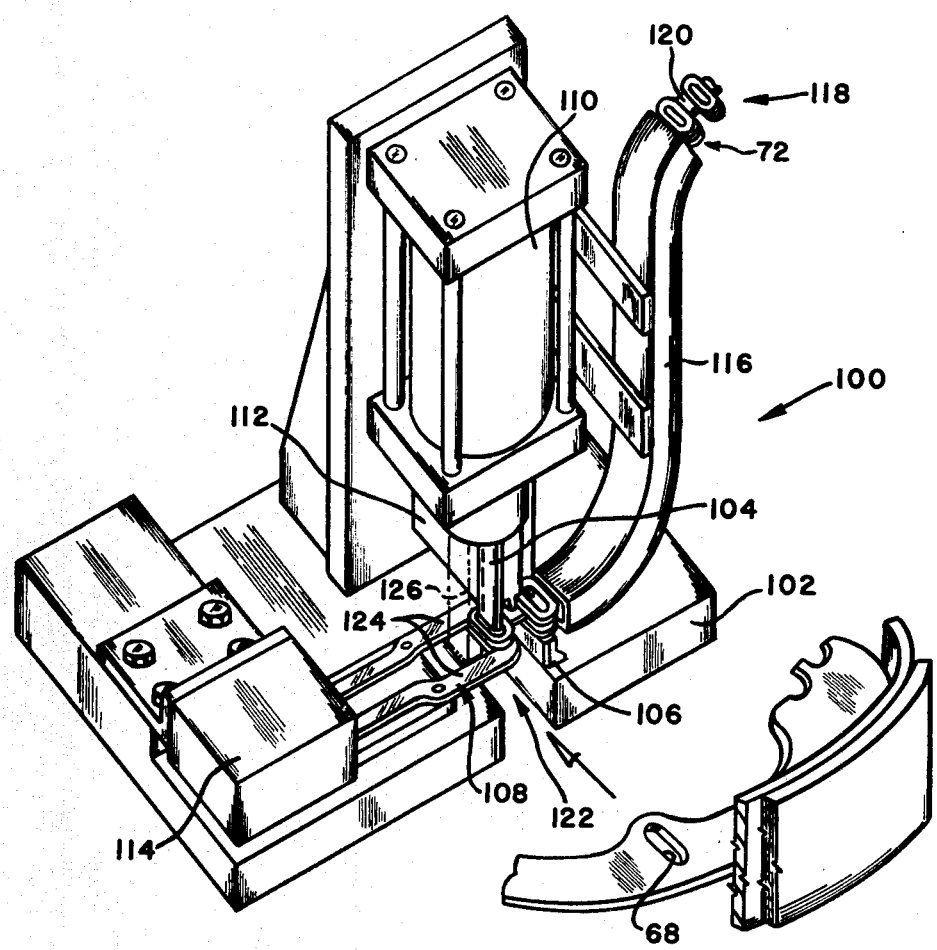
FIG. 4 is a fragmentary perspective view of a machine for use in installing elastomeric resilient members into brake shoe webs.

FIG. 4 illustrates a machine 100 for semiautomatically inserting resilient members 72 into the apertures 68 of brake shoes.

The machine 100 includes a base 102 which carries a tool assembly 104, a backup blade 106, and a feed assembly 108. The tool assembly 104, backup blade 106, and feed assembly 108 are sequentially reciprocated along mutually perpendicular axes by drive units 110, 112, and 114, respectively. Resilient members 72 are fed to the machine 100 via a feed chute 116. The resilient assemblies 72 are fed to the machine 100 in the form of an elongated belt 118 which includes a multiplicity of resilient members 72 which are connected by webs 120. The resilient members 72 and webs 120 are integral and are made from the same elastomeric material. The belt 118 is preferably made by compression or injection molding, which is well known in the art. The base 102 includes a fixture, or nest, 122 for receiving a brake shoe and holding the shoe with the aperture 68 positioned in alignment with the tool assembly 104. Viewing FIG. 4, it will be seen that the feed assembly 108 includes a pair of spaced-apart feed fingers 124. The feed fingers 124 extend to grasp the first resilient member on the belt 118, which projects from the feed chute 116, and draw the resilient member against a feed stop 126 (shown in dashed lines for clarity of illustration). Consequently, the belt 118 is advanced through the feed chute 116 by the feed fingers 124.

Figure 5:
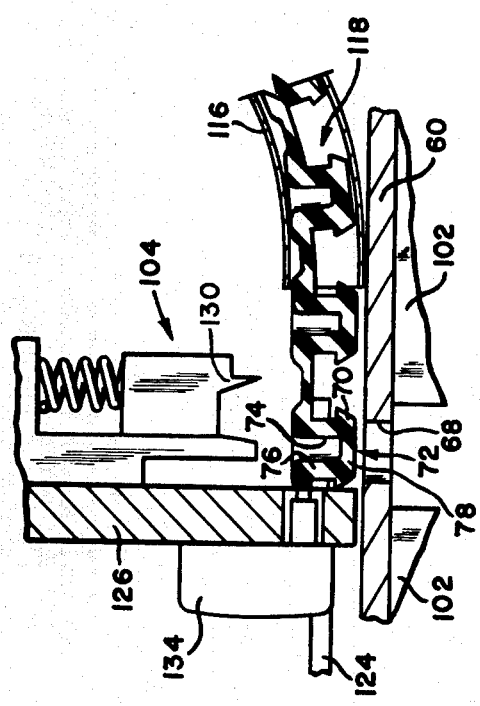

FIG. 5 illustrates the machine 100 preparatory to the start of an operating cycle. A resilient member 72 is positioned in engagement with the feed stop 126 and in alignment with the aperture 68 in a brake shoe web 60. The resilient member is held in engagement with the feed stop 126 by the feed fingers 124. It will be noted that the resilient member 72 is connected to the belt 118.

Figure 6:
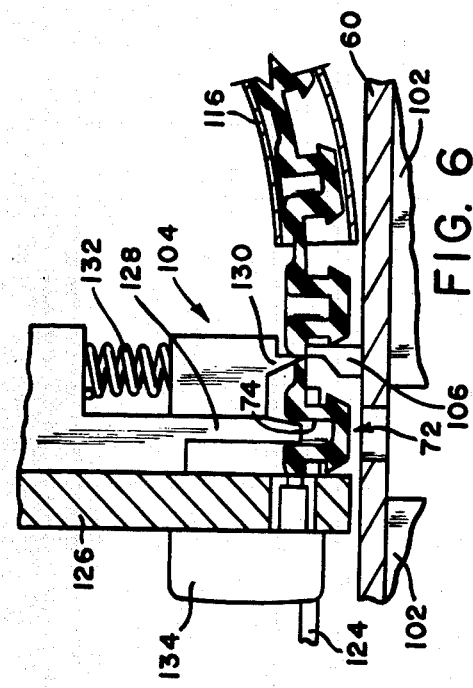
FIGS. 5–8 are fragmentary views of the machine which is illustrated by FIG. 4 showing steps in the method of manufacturing a drum brake according to the invention.

FIG. 6 illustrates an intermediate stage in the operating cycle of the machine 100. It will be noted that the backup blade 106 has been reciprocated into position below the web 120 by drive unit 112. Additionally, the tool assembly 104 is descending toward the resilient member 72. The tool assembly 104 includes an insert finger 128 which movably carries a cutoff blade 130. The insert finger enters the recess 74 of resilient member 72. Feed fingers 124 and insert finger 128 cooperate to hold the resilient member 72 while the cutoff blade 130 cooperates with the backup blade 106 to shear the web 120. The cutoff blade 130 is biased downward by a spring 132.

Figure 7:
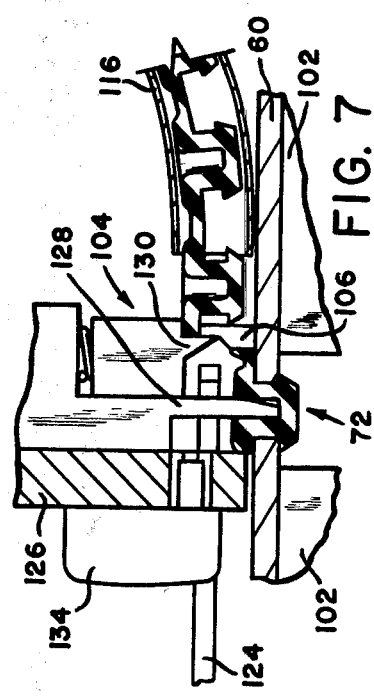

FIG. 7 illustrates a later intermediate stage in the operating cycle of the machine 100. Feed fingers 124 have opened to allow the insert finger 128 to fully enter the recess 74 of the resilient member 72. The resilient member 72 is forced into the aperture 68 of brake shoe web 60 by the insert finger 128. Downward movement of the cutoff blade 130 is prevented by the backup blade 106. As a result, the spring 132 is contracted.

Figure 8:
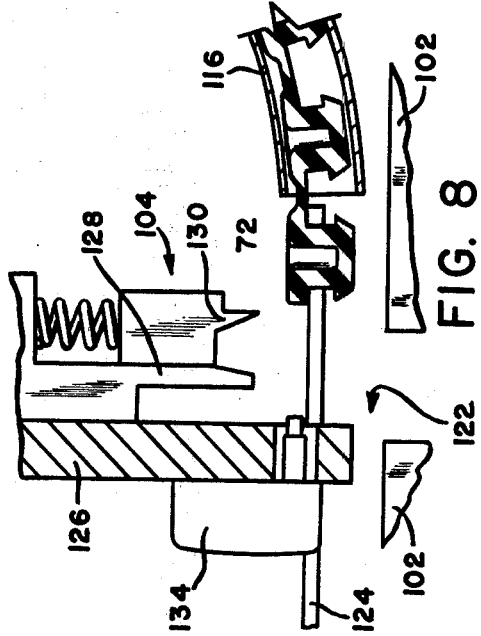

FIG. 8 shows the machine 100 at a later intermediate step in its operating cycle. The backup blade 106 has been retracted by drive unit 112. The tool assembly 104 has been raised by drive unit 110. The feed fingers 124 are advanced by drive unit 114 to grasp the next successive resilient member 72 on the belt 118. When the feed fingers draw the next successive resilient member 72 against the switch 134 on the feed stop, the machine has completed an operating cycle. The brake shoe carrying resilient member 72 has been removed. When another brake shoe is placed in the fixture 122, the operating cycle of the machine 100 may begin again.

Those skilled in the manufacturing arts will recognize that the operation of the machine 100 may be manually or automatically controlled. For exampple, the machine may be equipped with a limit switch in the fixture 122 to automatically initiate an operating cycle when a brake shoe is placed into the fixture.

Many variations of the present invention are possible by those skilled in the art and it is intended that these variations are included with the scope of the appended claims.

I claim:

1. A drum brake comprising a pair of arcuate brake shoes which are engageable with a rotatable brake drum to retard rotation of said brake drum during a brake application, said brake shoes including radially-extending webs which are slidably received in radially-extending slots defined by a nonrotatable torque member, characterized in that said brake shoes carry yieldable resilient elastomeric members which are slidably received through axially-extending apertures defined by the webs of said brake shoes, said elastomeric members extending axially on both sides of said brake shoe webs to frictionally engage said torque member, and said elastomeric members define a pair of oppositely-disposed irregular surfaces, said irregular surfaces slidably engaging said torque member.

2. The invention of claim 1 wherein said elastomeric members define a recess therein, said recess extending axially through said axially-extending aperture.

3. The invention of claim 1 wherein said elastomeric member includes a pair of spaced-apart, radially-extending flanges which circumscribe said axially-extending aperture on said brake shoe web.

4. A drum brake comprising:
a torque member including an anchor pin and a pair of circumferentially-spaced, radially-extending arms, said pair of arms defining a pair of radially-extending slots therein;
a pair of arcuate brake shoes defining pairs of confronting brake shoe ends, said brake shoes pivotally anchoring to said anchor pin at one pair of said confronting brake shoe ends, each of said brake shoes including a radially-extending web which is slidably received in one of said pair of radially-extending slots;
a strut received between the other pair of confronting brake shoe ends;
a hydraulic actuator cooperating with the pair of brake shoes adjacent said one pair of confronting brake shoe ends to move said brake shoes radially outwardly into engagement with a rotatable brake drum to effect a brake application; and
a pair of yieldable guide means cooperating with said torque member and with said brake shoes for guiding said brake shows radially while yieldably allowing a limited axial movement of said brake shoes relative to said torque member;
characterized in that said pair of yieldable guide means includes a pair of resilient elastomeric members received in an axially-extending aperture defined by the radially-extending web of each of said pair of brake shoes, said elastomeric members projecting axially from said brake shoe webs and being slidably received in the respective axially-extending slot of said torque member, said elastomeric members spacing said brake shoe webs from said torque member.

5. The invention of claim 4 wherein said axially-extending apertures of said brake shoes are radially elongated, said elastomeric members being elongated to substantially coincide with said axially-extending apertures, said elastomeric members further including a pair of spaced-apart, radially-extending flanges circumscribing said elongated apertures, said radially-extending flanges being adjacent opposite sides of said radially-extending webs.

6. The invention of claim 5 wherein said elastomeric members each includes a recess extending axially therein, said recesses extending substantially through said radially extending webs.

7. The invention of claim 4 wherein each of said pair of elastomeric members defines a pair of axially spaced-apart, radially extending surfaces which slidably engage said torque member.

8. The invention of claim 7, wherein said radially-extending surfaces are irregular.

* * * * *